United States Patent [19]

Okada

[11] Patent Number: 4,747,313

[45] Date of Patent: May 31, 1988

[54] TACTILE SENSOR

[75] Inventor: Tokuji Okada, Ibaraki, Japan

[73] Assignees: Agency of Industrial Science and Technology; Ministry of International Trade & Industry, both of Tokyo, Japan

[21] Appl. No.: 2,938

[22] Filed: Jan. 13, 1987

[30] Foreign Application Priority Data

Jan. 13, 1986 [JP] Japan .................................. 61-4872

[51] Int. Cl.⁴ .............................................. G01L 5/16
[52] U.S. Cl. ................................................. 73/862.04
[58] Field of Search ........... 73/862.04, 862.05, 862.06, 73/189

[56] References Cited

U.S. PATENT DOCUMENTS

| | | | |
|---|---|---|---|
| 2,985,014 | 5/1961 | Doersam, Jr. | 73/189 |
| 3,212,329 | 10/1965 | Bisberg | 73/189 |
| 3,713,343 | 1/1973 | Segerdahl | 73/517 R |
| 3,785,203 | 1/1974 | Mull | 73/189 X |
| 3,824,674 | 7/1974 | Inoyama et al. | 73/862.04 X |
| 3,939,704 | 2/1976 | Zipin | 73/862.04 |
| 4,099,409 | 7/1978 | Edmond | 73/862.04 |

Primary Examiner—Charles A. Ruehl
Attorney, Agent, or Firm—Oblon, Fisher, Spivak, McClelland & Maier

[57] ABSTRACT

A tactile sensor comprises a sensitive shell including a support rod, a sensor body for holding the support rod such that the sensitive shell is capable of three-dimensional operation, a plurality of elastic members each having one end connected to the sensor body and the other end connected to the sensitive shell, for elastically suspending the sensitive shell at a reference position and in a reference orientation with respect to the sensor body, and detection means provided on the elastic members for detecting the displacement of or deforming force on the plurality of elastic members.

2 Claims, 3 Drawing Sheets

TACTILE SENSOR

FIELD OF THE INVENTION AND RELATED ART STATEMENT

This invention relates to a tactile sensor which can be suitably used for robots or the like.

When causing a robot to repeat a simple operation or an operation of known procedure or actions, the actions may be preliminarily compiled as a computer program, whereby an accurate operation can be obtained according to the program. Where the operation is non-repetitive and changes instantaneously, however, it is necessary to correct or alter the program by making use of information from various sensors to obtain operation conforming to the situation at hand. In other words, a sensor enabling the robot to collect information is necessary. There are a wide variety of such sensors. Among these sensors, the tactile sensor, which is capable of sensing continuous variables of force or the like by touching an object, is particularly important.

Various tactile sensors of optical system, magnetic system, electrostatic capacitance system and mechanical system have been proposed so far.

With the prior art tactile sensors, a large number of tactile elements have to be arranged in order to obtain tactile information over a wide range depending on whether the sensor operation is one- or two-dimensional. For this reason, insensitive regions inevitably arise in practice. Further, since a large number of elements are arranged in a discrete fashion, it is difficult to reduce the size and weight of the sensor as a whole. Further, signal lines connected to an operational unit for signal processing increase in number with increase in the number of elements involved, leading to increased complexity in use.

OBJECT AND SUMMARY OF THE INVENTION

An object of the invention is to provide a tactile sensor, which is free from insensitive regions and can detect force from a touched body in any direction with high accuracy.

To attain the above object of the invention, the tactile sensor comprises a sensitive shell including a support rod, a sensor body for holding the support rod such that the sensitive shell is capable of three-dimensional operation, a plurality of elastic members each having one end connected to the sensor body and the other end connected to the sensitive shell, for elastically suspending the sensitive shell at a reference position and in a reference orientation with respect to the sensor body, and detection means installed on the elastic members for detecting the displacement of or deforming force on the plurality of elastic members.

According to the invention, the sensitive shell is supported by the sensor body such that it is capable of three-dimensional operation within required ranges. The sensitive shell is suspended at a reference position and in a reference orientation by plurality of elastic members such as springs. The displacement of or deforming force on the elastic members or displacement of the sensitive shell produced by an external force on the sensitive shell is detected by the detection means, and resultant detection signals are supplied to an operational unit for signal processing, whereby the magnitude, direction and point of action of the external force applied on the sensitive shell can be readily determined.

The above and other objects and features of the invention will become more apparent from the following detailed description with reference to the accompanying drawings.

DETAILED DESCRIPTION OF THE PREFERRED EMBODIMENTS

Figure 1A:
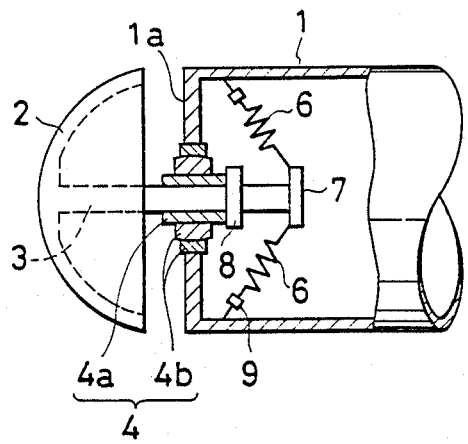
FIG. 1(a) is a side view, partly in section, showing a first embodiment of the tactile sensor according to the invention.
Figure 1B:
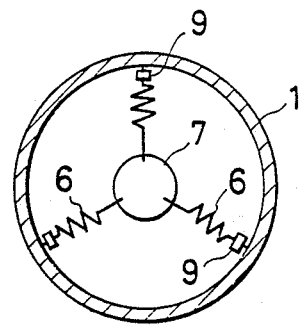
FIG. 1(b) is a transversal sectional view showing a part of the tactile sensor shown in FIG. 1(a)
Figure 2A:
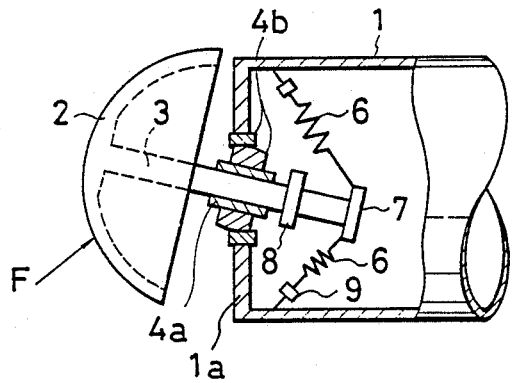
FIG. 2(a) is a side view, partly in section, showing the tactile sensor shown in FIG. 1(a) in a state experiencing an externally applied force.
Figure 2B:
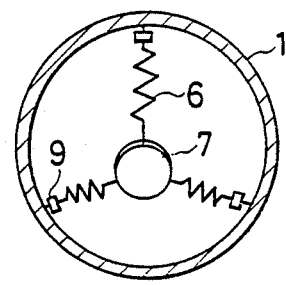
FIG. 2(b) is a transversal sectional view showing the tactile sensor shown in FIG. 1(b) experiencing an externally applied force.

FIGS. 1(a) and 1(b) show a first embodiment of the tactile sensor according to the invention; and FIGS. 2(a) and 2(b) show the tactile sensor experiencing an externally applied force. Referring to the drawings, a cylindrical sensor body 1 has an end plate 1a provided with a composite bearing 4 consisting of an axial slider 4a and a spherical bearing 4b at the center of the end plate 1a. The axial slider 4a is supported in the spherical bearing 4b. Reference numeral 2 designates a sensitive shell. In this embodiment, the sensitive shell has a hemispherical form and is integral with a support rod 3 extending from the inner surface. The support rod 3 is supported for axial movement and rotation in the composite bearing 4.

The sensitive shell 2 which is supported by the support rod 3, is disposed at a position slightly spaced apart from the end plate 1a of the sensor body 1 such that it is tiltable in all direction with respect to the sensor body 1 and is also axially displaceable. A disk 7 is secured to the free end of the support rod 3 projecting from the bearing 4 into the sensor body 1. A plurality of radially uniformly spaced-apart extension springs 6 are connected at one end to the edge of the disk 7 and coupled at the other end to the inner periphery of the sensor body 1 via respective detection means 9.

Figure 3:
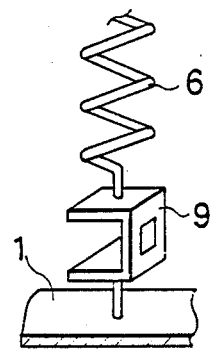
FIG. 3 is a view showing a strain gauge used as the detection means of the tactile sensor.

In the absence of any external force applied to the sensitive shell 2, a ring-like stopper 8 provided on an intermediate portion of the support rod 3 comes into contact with the bearing 4, and the sensitive shell is biased such that it can balance at a reference position in a reference orientation. The detection means 9 provided on the springs 6 detect the deformation of deforming force of the springs. If a beam with a load cell or strain gauge is applied to the spring as the detection means, the extension force of the spring, i.e., deforming force, can be detected. FIG. 3 shows an example of this arrangement. Output signals from the detection means 9 are supplied to an operational unit (not shown) for processing.

The operational unit converts the input signals from analog to digital and determines the position vector of the rod or force vector of the spring by using known parameters such as spring coefficient and the angles at which the springs are arranged. In this way, the operational unit calculates the magnitude, direction and point of action of the external force acting on the sensitive shell. When two or more external forces are simultaneously applied, the results of calculation represent values concerning the resultant force.

The basis of the calculation is as follows: Since the detection means senses the displacement of springs, the range of positions the end point of a spring (coupled to the disk 7) assumes can be expressed as a circular arc. When the support rod 3 is rotated about its axis, however, the range is generally expressed as a spherical surface. Since the distance between the ends of the springs 6 on the disk 7 is known and also a straight line passing through the center of the disk at an angle of 90 degrees passes through the center of the composite bearing 4, the position and inclination of the disk satisfying the above conditions are determined by geometric calculations. It should be noted that since the position of the disk is expressed as a function of the deforming force, it is possible to obtain the magnitude, direction and point of action of an external force acting on the hemispherical sensitive shell 2 at a point thereof.

The example shown in FIG. 1(a) uses four extension springs 6, while the example shown in FIG. 1(b) uses three extension springs. However, it is possible to use only two extension springs so long as the required biasing force can be obtained.

The sensitive shell 2 and sensor body 1 may be made of a synthetic resin. The sensitive shell is not limited to the hemispherical shape, but it is possible to use a cylindrical or rod-like sensitive shell as well. When an external force is applied to the sensitive shell 2 as shown by an arrow F in FIG. 2(a), the support rod 3 supporting the sensitive shell 2 is pushed into the sensor body 1 and inclined against the biasing force of the extension springs 6. More specifically, the sensitive shell that has been at the reference position and in the reference orientation as shown in FIGS. 1(a) and 1(b), is displaced against the restraining force of the extension springs 6. As a result, the extension springs 6 connected to the support rod 3 undergo deformation, and a reaction force is generated according to the displacement. The detection means 9 installed between each extension spring 6 and the sensor body 1 detects the deforming force, and the operational unit performs calculations to determine the extent of displacement of the support rod 3 into the sensor body 1 and the inclination angle of the support rod. Then the amount of displacement and inclination angle are expressed as functions of the magnitude, direction and point of action of the external force F applied to the sensitive shell.

Usually, a linear bushing is used as the axial slider 4a of the composite bearing 4, and a semiconductor strain gauge as the element at the detection means 9. However, it is also possible to use other suitable mechanical elements and detection elements. When the detection means 9 can detect not only the longitudinal strain but also the transversal strain in the springs, it is possible to detect the rotational angle of the sensitive shell 2 rotating about the axis of the support rod 3 and calculate the external force F not passing through the center of the composite bearing 4.

Figure 4A:
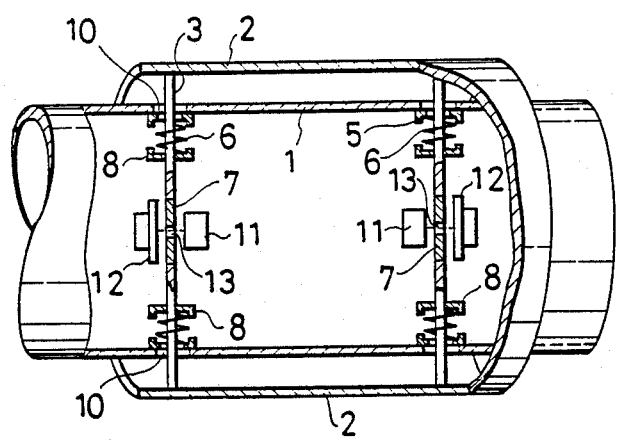
FIG. 4(a) is a side view, partly in section, showing a part of a second embodiment of the tactile sensor according to the invention.

FIGS. 4(a), 4(b), 5(a) and 5(b) show a second embodiment of the tactile sensor according to the invention. The sensitive shell 2 in this embodiment is of cylindrical form with a diameter greater than the diameter of the cylindrical sensor body 1. The sensitive shell 2 is disposed to surround the cylindrical sensor body 1. Two groups of support rods 3 are provided in the cylindrical sensitive shell 2 at two axially spaced-apart positions. A plurality of support rods in each group inwardly and perpendicularly extend from the inner surface of the cylindrical sensitive shell 2 by penetrating through holes 10 in the sensor body 1. The free ends of the support rods 3 in each group are connected to a connecting disk 7 by suitable means, e.g., soldering, screws, etc. In the example of FIG. 4(a), each group consists of four support rods, while in the example of FIG. 4(b) each group consists of three support rods. Each support rod 3 has a disk-like stopper 8. The spring 6 acts as an elastic member on each support rod 3 in a state compressed between the stopper 8 and a spring retainer 5. The sensor body 1 thus elastically suspends the sensitive shell.

The cylindrical sensor body and cylindrical sensitive shell are made coaxial by adjusting the positions of the stoppers 8 on the support rods 3. The springs 6 serving as the elastic members may be replaced with rubbers having holes through which the support rods 3 penetrate. The elastic members may be arranged in a state free from any stress, or they may be arranged such that their compression or extension stresses are in equilibrium. Although not shown in the Figures, means for detecting the deforming force or amount of displacement is provided on each extension spring similarly to the first embodiment.

Figure 4B:
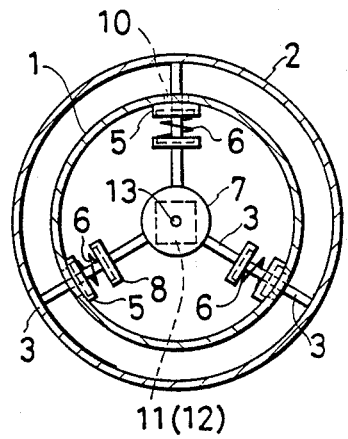
FIG. 4(b) is a transversal sectional view showing a part of the tactile sensor shown in FIG. 4(a)
Figure 5A:
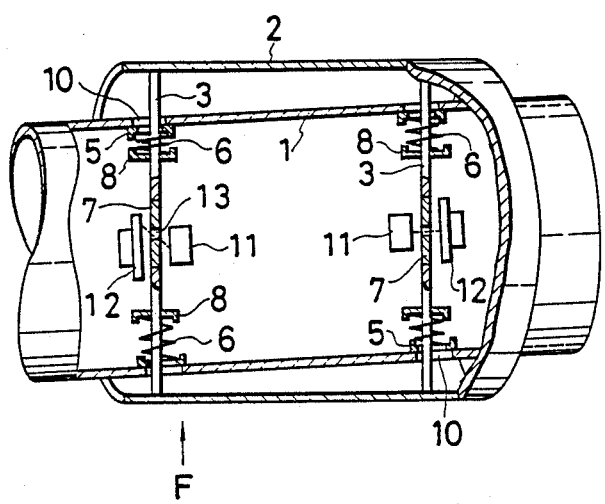
FIG. 5(a) is a side view, partly in section, showing the tactile sensor shown in FIG. 4(a) experiencing an externally applied force.
Figure 5B:
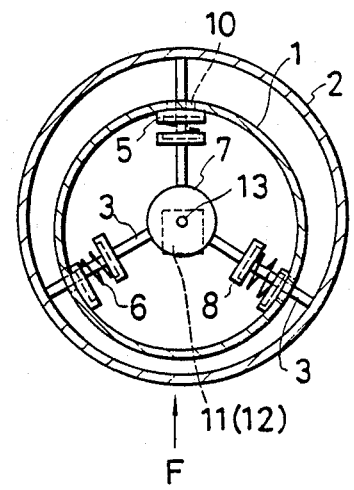
FIG. 5(b) is a transversal sectional view showing the tactile sensor shown in FIG. 4(b) experiencing an externally applied force.

When an external force F is exerted on the sensitive shell 2 in a state where the cylindrical sensor body 1 and cylindrical sensitive shell 2 are coaxial with each other as shown in FIGS. 4(a) and 4(b), the two cylindrical bodies become eccentric with respect to each other as shown in FIGS. 5(a) and 5(b). More specifically, the elastic member 6 at positions closer to the point of action of the external force F are elongated, while the elastic members 6 on the other side are contracted, whereby the sensitive shell is stabilized. When the point of action of the external force F is shifted progressively to the right from the position shown in FIG. 5(a), the extent of deformation of both the support rods 3 and elastic members 6 on the right side is progressively increased and eventually becomes greater than the extent of deformation of both the support rods 3 and elastic members 6 on the left side.

Thus, the extent of elongation or contraction of each elastic member 6 and the resultant stress can be detected by a detection means (not shown), and the data obtained can be processed to calculate the magnitude, direction and point of action of the external force F applied to the sensitive shell 2.

Where the connecting disk 7 to which the end of each support rod 3 is connected is integral with the sensitive shell 2 as in the embodiment shown in FIGS. 4(a), 4(b), 5(a), and 5(b), the connecting disk 7 may be provided with a pin hole 13 at the center, i.e., at the position corresponding to the axis of the sensitive shell 2, a light-emitting element 11 and a position detection element 12 may be provided on the axis on the opposite sides of the pin hole 13, whereby it is possible to readily detect a slight displacement of the sensitive shell with respect to the sensor body. In this case, there is no need of providing any detection element on the elastic members.

Figure 6:
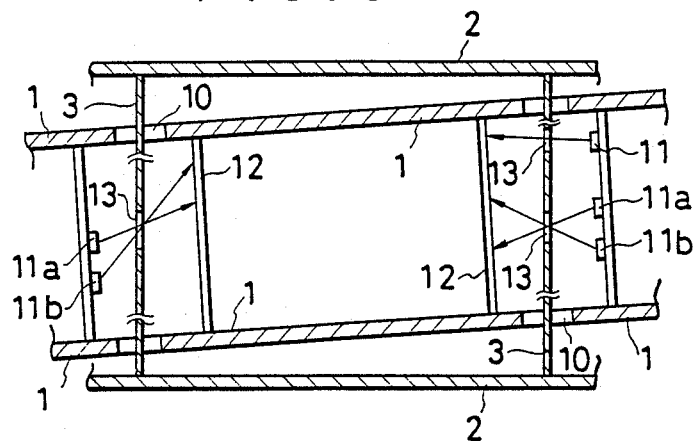
FIG. 6 is a view showing a different example of detection means in the tactile sensor shown in FIG. 4(a)

A single light-emitting element 11 as shown in FIGS. 4(a) and 5(a) is sufficient for the detection of the displacement of the sensitive shell in the radial direction. When it is desired to obtain detection in all directions, two light-emitting elements 11a and 11b may be mouhted on a substrate unified with the sensor body as shown in FIG. 6 from which the elastic members and detection means have been omitted by why of structural simplification.

The positions of the light spot from the light-emitting elements is detected by a position detection element, so that it is possible to calculate the position of the pin hole 13 in the disk 7 as an intersection of two light beam paths by an operational unit (not shown). However, where the detection element 12 cannot simultaneously detect two or more light spot points as in the PSD (Position Sensitive Device), it is necessary to cause flickering of the light-emitting elements 11 one after another to determine the light spot positions separately. The inclination and axial positional deviation of the sensitive shell with respect to the sensor body can be calculated by using the calculated result of the pin hole position.

Further, since the light-emitting element 11 and the pin hole 13 for detecting the angle of rotation of the sensitive shell about the axis of the sensor body are provided on either side of the sensitive shell, the rotational angle of the sensitive shell can be calculated, by using the positional information of a light spot, in addition to the information regarding inclination and axial deviation of the sensitive shell that has already been obtained. Obviously, the positional information can be obtained by using the same detection element 12. When the inclination, axial deviation and rotational displacement of the sensitive shell are determined, the deformations due to the elastic members are all calculated, so that it is possible to strictly determine the magnitude, direction and point of action of the external force acting on a single point on the sensitive shell. For example, when the elastic members at two sides of the sensitive shell have the same elastic modulus, the position of action of the force F is determined according to the ratio of the radial displacements at the two sides. If the displacements are equal, the position of action is determined to be at the middle point of the sensitive shell, and the magnitude of the force is expressed as the sum of deformations.

Where the length of the sensitive shell is reduced and only a single set of support rods 3 is provided, it is also possible to detect not only the magnitude but also the direction of the external force F. Further, by constructing the sensor body and sensitive shell of a conductive material and using them as switch contacts, only a case of application of an external force for bringing the two into contact with each other can be readily detected. That is, an on-off tactile sensor can be obtained.

In the above embodiment, the elastic members 6 are each fitted on each support rod 3 and disposed between the spring retainer 5 provided on the inner surface of the sensor body and the disk-like stopper 8 on the support rod. However, it is possible to house each spring between the edge of each hole 10 on the sensor body and the inner surface of the cylindrical sensitive shell 2.

Figure 7:
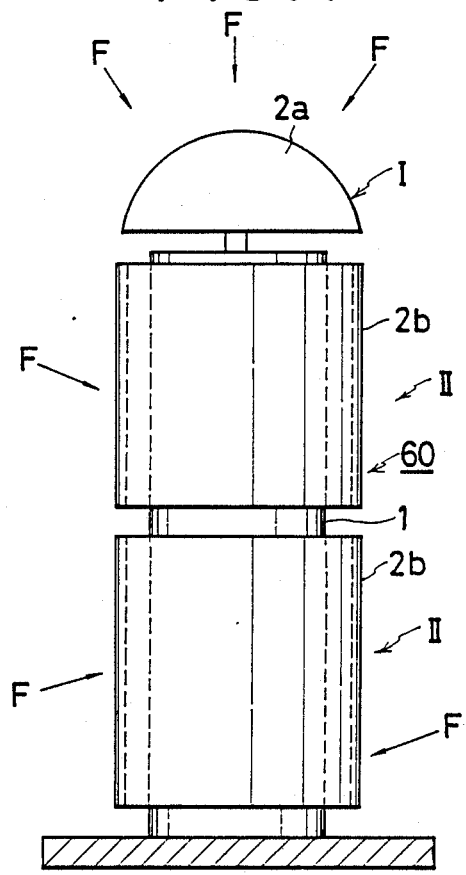
FIG. 7 is an explanatory view of a joystick constructed by applying the present invention.

As has been shown, the tactile sensor according to the invention is an analog sensor, which can calculate the magnitude, direction and point of action of an external force applied to the sensitive shell. It can be utilized as a force input device of a joystick or the like. FIG. 7 shows an example of the construction of a joystick for a grip. The joystick comprises a top tactile sensor I of the first embodiment having the hemispherical sensitive shell 2a and two tactile sensors II of the second embodiment having the cylindrical sensitive shell 2b. Using this joystick it is possible to give instructions which are understandable intuitively. For example, it is possible to change the direction or speed of motion of various parts of robots by varying the direction and magnitude of forces given to the joystick, where the downside sensor II, the upside sensor II and the top sensor I are supposed to be a shoulder or an arm, an elbow, and a wrist of the robots, respectively.

It is a feature of the invention that the sensitive shell and sensor body are integrated such that there is no insensitive zone, and the effects of the invention can be obtained to the utmost when the invention is utilized in artificial fingers having articulations. Where an object is handled with only the fingers, the object can be handled without dropping it only when the entire surface of the fingers is provided with the sense of touch. This invention makes it possible to provide an artificial finger with a sophisticated sense like the sense of human skin. Further, by appropriately selecting elastic members to be used, the displacement versus force characteristics of the sensitive shell can be varied according to the rotation angle of the sensor body about the axis. For example, it is possible to increase the sensitivity of the sensor in a particular direction or produce a uniform sensitivity independent of the rotation angle.

Further, the sensor body can accommodate optical or electric components inside, so that the operation can be performed without hindrance from signal lines. Also, the entire finger can be reduced in size. Further, information equivalent to that obtainable when an infinite number of sensors are provided is collected with a limited number of signal lines, so that it is possible to dispense with means for scanning sensors and reduce the weight of the overall sensor device. Further, even if an unexpected high force should be applied to the sensitive shell, the sensor body will safely receive this force. Therefore, the sensitive shell need not be made of a metal but may be made of a material lighter in weight so long as it has sufficient rigidity to maintain a shape similar to that of the sensor body. From this standpoint, the sensor body can be readily reduced in weight.

While a few different embodiments have been described above, the modes of the invention are not limited to the end sensor and outer periphery sensor described above, but various changes and modifications may be made by techniques known to designers. For example, the sensitive shell may be constituted by only the rounded end of the support rod noted above. Also, in addition to the elastic members 6 as shown in FIG. 1(a), a plurality of springs in a plane parallel to the end plate 1a may be used to hold the support rod at the reference position and in the reference orientation. Further, the elongation or contraction of the elastic member or the displacement in the shearing direction may be detected with a potentiometer or other well-known displacement detection means.

As has been made obvious, the tactile sensor according to the invention can detect external forces applied not only to the end surface of the sensor body but to the entire outer periphery thereof and is thus free from any insensitive zone. More specifically, according to the invention, the sensitive shell is provided with a support rod and a plurality of elastic members and is held elastically at a reference position and in a reference orientation by a body receiving the end of the support rod, which is capable of three-dimensional operation with a required range. Therefore, when the sensitive shell is displaced by an external force, the displacement of or deforming force on each elastic member or support rod is detected, and the external force can be determined through geometrical calculations performed in an operational unit usihg the data noted above.

In other words, the tactile sensor according to the invention is a novel mechanical tactile sensor serving as a probe, which determines versatile contact states with a small number of detection data by making use of the operational and analytic functions of a computer. Since the sensitive shell is suspended at the reference position and in the reference orientation by the elastic members, when the external force is removed, the elastic members accurately restore to the initial state. Further, since the dimensional change of the elastic member is due to an external force proportional to the change of the force itself, when either one of the changes is detected, the other can also be determined. It is thus possible to simplify the detection and facilitate the size reduction of the tactile sensor.

Further, when the invention is applied to a robot, it is possible to make a hand or a finger sensitive with a function like the tactile sense of human skin. It is thus possible to realize a sensor for multi-jointed fingers which has heretofore been difficult to obtain.

What is claimed is:

1. A tactile sensor comprising;
    a hemispherical sensitive shell including a support rod extending rearward from said sensitive shell,
    a cylindrical sensor body having an end plate provided with a composite bearing, in which the free end portion of said support rod is received such that said support rod is capable of axial movement, rotation and tilting in predetermined ranges;
    a stopper provided on the end of said support rod to prevent detachment of said support rod from said bearing;
    a plurality of elastic members each secured at one end to the inner wall of said sensor body near said end plate and coupled at the other end to the end of said support rod, for suspending said support rod at a reference position and in a reference orientation with said stopper in contact with said bearing; and
    a strain gauge provided on each said elastic member.

2. A tactile sensor comprising:
    a cylindrical sensitive shell including two axially spaced-apart support rod sets provided on the inner surface of said sensitive shell, each said support rod set consisting of a plurality of support rods inwardly extending toward one another;
    a cylindrical sensor body having holes, through which said support rods penetrate such that said sensitive shell is capable of three-dimensional operation in a necessary range;
    a plurality of elastic members each secured at one end to the edge of each said hole and coupled at the other end to said support rod or to the inner surface of said sensitive shell, for elastically suspending said cylindrical sensitive shell at a reference position and in a reference orientation with respect to said sensor body; and
    detectors each for detecting the displacement or deforming force of each said elastic member or displacement of each said support rod.

* * * * *